(No Model.) 2 Sheets—Sheet 1.

V. ROYLE & J. ROYLE, Jr.
ROUTING MACHINE.

No. 442,826. Patented Dec. 16. 1890.

Witnesses:
D. H. Haynes
C. L. Sundgren

Inventor
Vernon Royle & John Royle Jr.
by their attorneys
Brown & Seward

THE NORRIS PETERS CO., PHOTO-LITHO., WASHINGTON, D. C.

(No Model.) 2 Sheets—Sheet 2.

V. ROYLE & J. ROYLE, Jr.
ROUTING MACHINE.

No. 442,826. Patented Dec. 16, 1890.

Witnesses:—
O. N. Haywood
C. Sundgren

Inventor:—
Vernon Royle & John Royle Jr
by their attorneys
Brown & Seward

UNITED STATES PATENT OFFICE.

VERNON ROYLE AND JOHN ROYLE, JR., OF PATERSON, NEW JERSEY.

ROUTING-MACHINE.

SPECIFICATION forming part of Letters Patent No. 442,826, dated December 16, 1890.

Application filed July 9, 1890. Serial No. 358,148. (No model.)

*To all whom it may concern:*

Be it known that we, VERNON ROYLE and JOHN ROYLE, Jr., both of Paterson, in the county of Passaic and State of New Jersey, have invented a certain new and useful Improvement in Routing-Machines, of which the following is a specification.

Our invention relates to an improvement in routing-machines in which a cutter is employed having a movement toward and away from the material upon which it operates for the purpose of deepening, widening, and contracting the cuts upon a block or plate for purposes of embossing, engraving, die-cutting, and the like.

A practical embodiment of our invention is represented in the accompanying drawings, in which—

Figure 1:
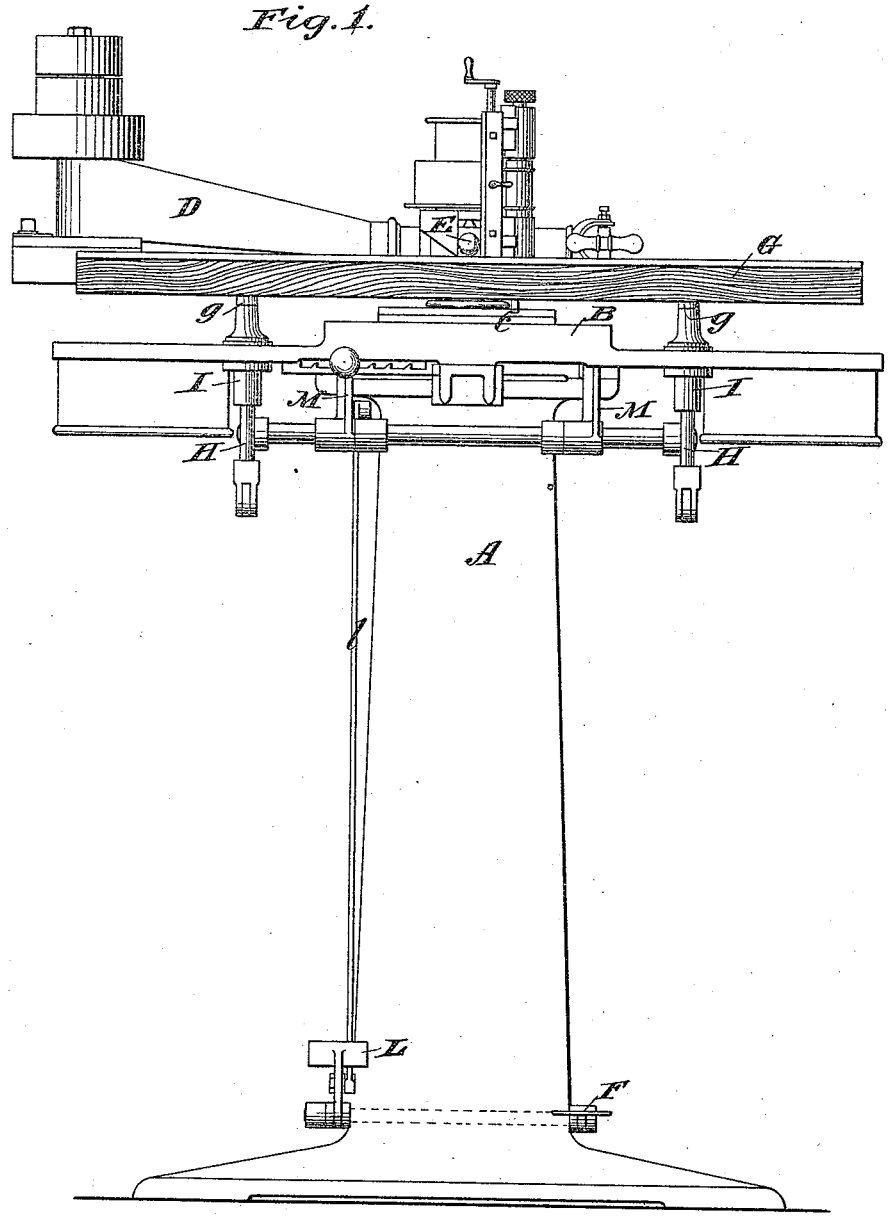
Figure 2:
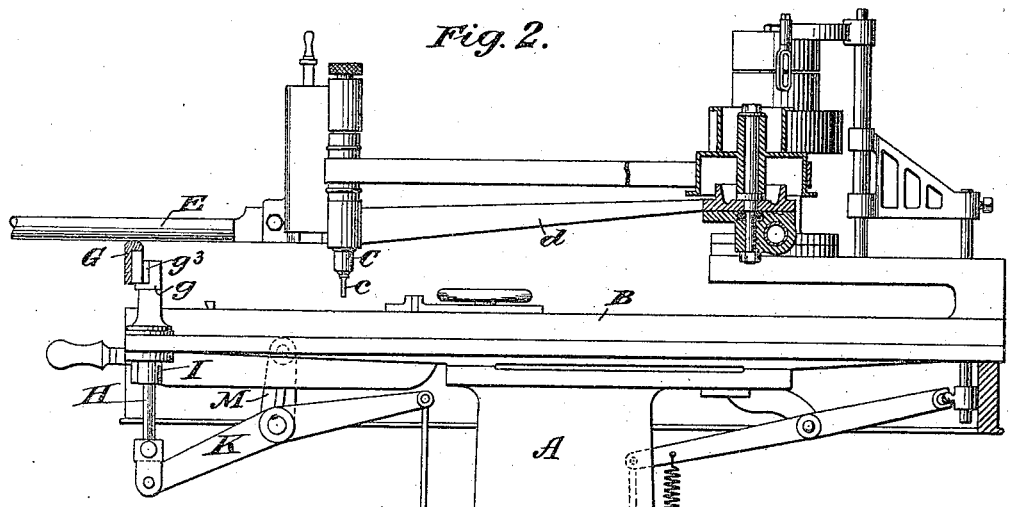
Figure 3:
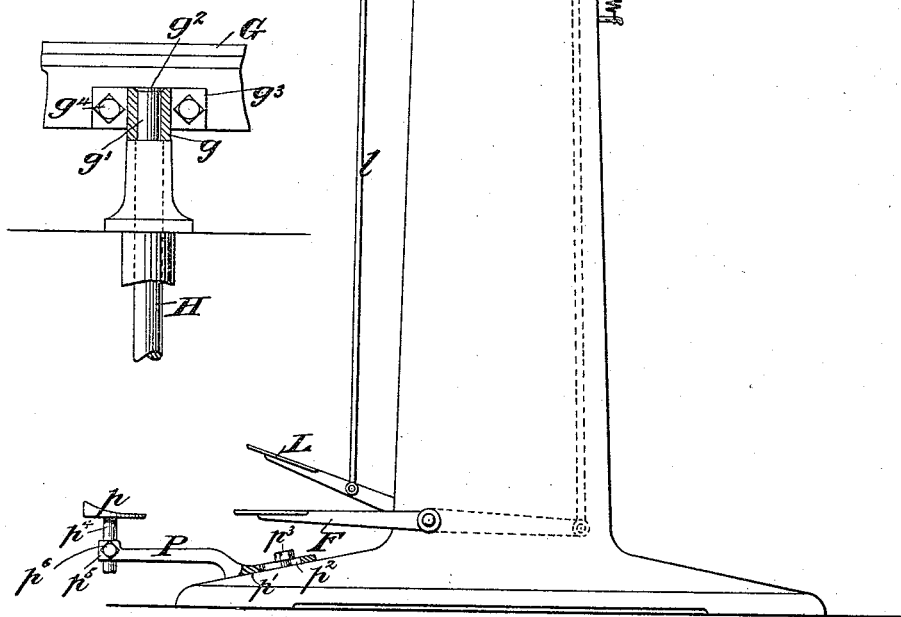

Figure 1 is a front view of the machine; Fig. 2, a side view, partly in section; and Fig. 3, a detail view.

The machine herein shown is of the same general type as that fully shown and described in our Letters Patent No. 374,707, granted us on December 13, 1887, the present improvement consisting in the construction by which the guide-bar, which forms a rest for the handle for guiding the cutting-tool, may be raised and lowered bodily, thereby regulating the depth of cut with great precision, and where the guide-bar is elevated and lowered by a foot-pedal mechanism, as herein shown, leaving the hands free to manipulate the cutting-tool in its variable movements laterally, or the handling of the material being operated upon.

The support A, the work-table B, the cutter-holder C, supported in the arm-section $d$, pivotally secured to the arm-section D, by means of which the tool is allowed a universal movement, the idle and driving pulleys, and the belts connecting them, by means of which power is communicated to the tool, a suitable drive-shaft, the handle E for controlling the movements of the tool, and the pedal F, connecting with belt-shifting mechanism, are all constructed and arranged in substantially the same manner as the corresponding parts in our patent hereinabove referred to, and a more detailed description thereof is omitted herein.

G represents the guide-bar, which forms a rest for the handle E or for the arm of the operator, or for both in manipulating the cutting-tool. The bar G is fixed to a pair of supporting-heads $g$, the latter being fixed to the upper ends of a pair of guide-rods or plungers H. We find a very convenient and satisfactory connection between the rods H, the heads $g$, and the guide-bar G to be as follows: The heads $g$ are provided with central perforations which receive the upper reduced ends $g'$ of the rods H, the heads $g$ seating upon shoulders at the base of said reduced portion, and the upper ends of the rods H are upset, as shown at $g^2$. The heads $g$ are further provided with laterally-projecting wings $g^3$, through which bolts $g^4$ are passed to secure the rest G firmly to the heads $g$. The rods H have a free vertically-sliding movement within sockets I fixed to the table, and because of the connection therewith of the guide-bar G the latter is elevated and depressed simultaneously with the elevation and depression of the rods H. To the lower ends of the rods H one end of an operating-lever K is coupled, the opposite end of said lever K being connected with an operating foot-pedal L by a connecting-rod $l$. The lever K is fulcrumed upon a swinging link M, attached to the table. The swinging of the link M compensates for the throw of the end of the lever K out of the line of the movement of the rods H, so that the latter are free to move without any tendency to bind. The cutting-tool $c$ may be supplied with a tapered cutting end, the abruptness of the taper being determined by the particular class of work to be performed, so that the deeper the tool is allowed to cut the wider will be the cut at the top, and vice versa.

In operation the operator, by a skillful manipulation of the pedal L, may elevate and depress the guide-bar G, and thereby elevate and depress the cutting-tool $c$, so as to widen and contract the several cuts with the greatest nicety, while his hands are free to attend to the lateral movements of the cutter or the handling of the material operated upon. The cutter may also be quickly raised entirely out of contact with the material and swung from side to side in order to engage the material at a new point.

A foot-support consisting of a shank P and a heel-rest $p$, attached to the outer end of the shank, is located in such a position relatively to the foot-pedal L as to relieve the pedal of unnecessary weight and materially lessen the weariness of the operator. The shank P is provided with a beveled under face $p'$ to fit the upper face of the base, and with an elongated slot $p^2$, through which a binding-screw $p^3$ extends to clamp the support to the base in the desired lateral adjustment and in its adjustment toward and away from the pedal.

The heel-rest $p$ is provided with a depending standard $p^4$, which is free to move up and down in a suitable socket $p^5$ in the shank to give the rest the desired height, and a set-screw $p^6$ serves to lock the said rest in the desired adjustment.

What we claim as our invention is—

1. In a routing-machine, the combination, with a cutting-tool and a handle or bar for manipulating it, of a vertically-movable guide bar or rest for engaging said handle or bar, and means for controlling the vertical movement of the guide bar or rest, substantially as set forth.

2. In a routing-machine, the combination, with a cutting-tool and a handle or bar for controlling its movements, of a guide bar or rest, vertically-movable supports for said guide bar or rest, an operating-lever coupled to said vertically-movable supports and connected with a foot-pedal, and a swinging support upon which said operating-lever is fulcrumed, substantially as set forth.

3. In a routing-machine, the combination, with a suitable cutting-tool, a foot-pedal, and intermediate mechanism between the foot-pedal and tool for manipulating the tool, of a foot-support secured in position to receive the heel of the operator while the ball of the foot rests upon the pedal, and means for adjusting the foot-support, substantially as set forth.

VERNON ROYLE.
JOHN ROYLE, Jr.

Witnesses:
C. F. MAGER,
WILL. J. McCOLLOM.